United States Patent [19]
Hattori

[11] Patent Number: 6,013,224
[45] Date of Patent: Jan. 11, 2000

[54] PROCESS FOR PRODUCING LONG CERAMIC BODY

[75] Inventor: Mitsuru Hattori, Ama-gun, Japan

[73] Assignee: NGK Insulators, Ltd., Japan

[21] Appl. No.: 08/988,356

[22] Filed: Dec. 10, 1997

[30] Foreign Application Priority Data

Dec. 18, 1996 [JP] Japan .................................. 8-338213

[51] Int. Cl.[7] .................................................. C04B 33/32
[52] U.S. Cl. ........................................ 264/671; 264/605
[58] Field of Search ..................................... 264/605, 671

[56] References Cited

U.S. PATENT DOCUMENTS

| | | | |
|---|---|---|---|
| 1,513,617 | 10/1924 | Litt | 264/605 |
| 2,948,949 | 8/1960 | Schuffler et al. | 264/605 |
| 5,227,105 | 7/1993 | Eucker et al. | 264/57 |
| 5,336,569 | 8/1994 | Misawa et al. | 429/31 |
| 5,514,313 | 5/1996 | Yoshida | 264/671 |

*Primary Examiner*—Christopher A. Fiorilla

[57] ABSTRACT

A method for producing a long ceramic body with lower shape fluctuations and higher shape accuracy, by controlling the deformation of the long ceramic body, includes firing a long non-sintered ceramic body which has been suspended in a sheath so as not to contact directly the interior surface of the sheath, at a sufficient temperature and for a sufficient time until sintering is completed; inverting the long body; and re-firing the long body at a sufficient temperature for re-sintering the same. A predetermined downward load is applied to the long body in the vicinity of the bottom thereof during re-firing.

16 Claims, 6 Drawing Sheets

⇒ INVERSION

⇒ INVERSION

POSITION A

POSITION B

PROCESS FOR PRODUCING LONG CERAMIC BODY

BACKGROUND OF THE INVENTION AND RELATED ART STATEMENT

The present invention relates to a method for producing a long ceramic body, and more specifically, to a method for producing a tubular ceramic body used, for example, in a heat transfer tube for a shell-and-tube-type heat exchanger and the like.

Heretofore, long ceramic members for the use in heat transfer tubes for ceramic shell-and-tube-type heat exchangers and the like (hereafter referred to as "long ceramic bodies") have been manufactured. Such long ceramic bodies are normally manufactured by calcining molded bodies as required obtained by molding material powders using various molding methods into desired long shapes, then heating and firing the molded bodies suspended in a sheath so as not to contact them directly with the interior surface of the sheath.

In order to prevent warp in the lower part of the long body due to slight difference in density within the molded body during the firing process, the long body 5 is first fired until sintering is completed at a temperature at which sintering can take place, as FIG. 2(a) shows, then the long body 5 is inverted upside down and fired again at a temperature at which sintering can take place. When the long body 5 is fired under the condition in which it is suspended, warping is inhibited in the upper part of the long body 5 where a strong downward tensile force is applied by its self weight, whereas warping occurs in the lower part of the long body 5 during the firing process because little force that inhibits deformation is applied to the lower part. Therefore, by inverting the lower part with large warping so as to become the upper part, and firing again at a temperature at which plastic deformation takes place, the lower part (the upper part during second firing) warped during first firing is pulled downwards by the self weight of the long body 5, and warping is corrected.

In recent years, however, although increase in the length of heat transfer tubes has been investigated in the development of ceramic shell-and-tube-type heat exchangers, problems arise on difficult assembling the tubes with tube plates by firing as the length of heat transfer tubes increases due to the warp of the tubes which has not caused problems if the length of the tubes is short. Therefore, the development of a method for producing long ceramic bodies with higher accuracy of shapes such as straightness compared with conventional short tubes. Specifically, the achievement of straightness of 0.5 mm or less is desired.

Under such situations, since the conventional methods in which the long bodies are merely inverted upside down can achieve the straightness of up to about 1.0 mm, and the manufacture of long ceramic bodies to meet requirements in heat transfer tubes with increased length has been difficult.

Also in conventional methods, since warp was corrected only by the self weight of long bodies, variation was caused in the correction of warp, and the accuracy in the shape of resulted long ceramic bodies was fluctuated.

The present invention was accomplished in consideration of such situations, and it is an object of the present invention to provide a method for producing a long ceramic body with a high shape accuracy with low fluctuations of shape accuracy, by controlling the deformation of the long ceramic body during the firing process.

SUMMARY OF THE INVENTION

According to the present invention, a method for producing a long ceramic body is provided, which comprises steps of firing a long non-sintered ceramic body under a condition where said long body is suspended in a sheath so as not to contact it directly with the interior surface of said sheath, at a temperature at which sintering can take place, until sintering is completed; then inverting said long body upside down; and re-firing said long body at a temperature at which sintering can take place; wherein a predetermined downward load is applied to said long body at the vicinity of the bottom thereof during said re-firing. The magnitude of the load is preferably 0.01–300 MPa. The load is preferably applied by having the long body carry a weight at the vicinity of the bottom thereof. The temperature of re-firing is preferably 800° C. or above.

For the purpose of the present invention, the term "non-sintered ceramic body" means a molded ceramic body (green sheet) or a calcined ceramic body (calcined green sheet).

Also, "the completion of sintering" means that the shrinkage of a non-sintered ceramic body has reached 98 percent of the shrinkage when the non-sintered ceramic body becomes a sintered body of a relative density of 100 percent.

Furthermore, a "long ceramic body" means a ceramic member having a shape of a rod, a tube, or the combination thereof (a shape having both rod and tubular shapes in a single member).

PREFERRED EMBODIMENTS OF THE INVENTION

Figure 1A:
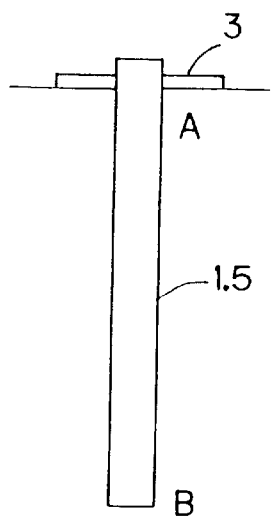
FIGS. 1(a) to 1(b) show a diagram illustrating a method for producing a long ceramic body of the present invention.
Figure 1B:
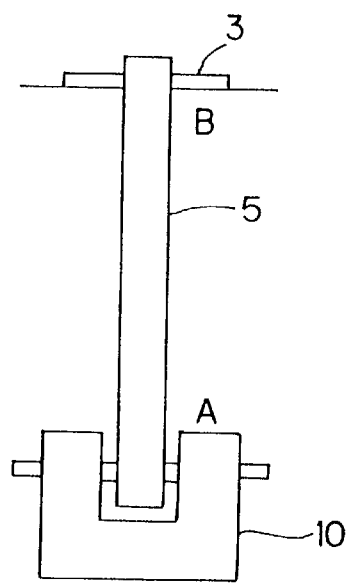
Figure 2A:
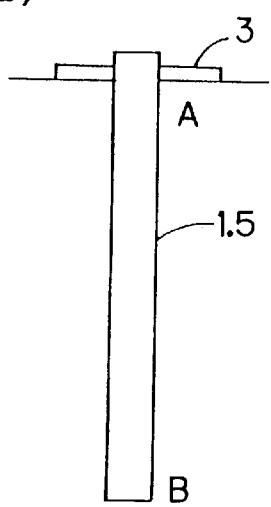
FIGS. 2(a) to 2(b) show a diagram illustrating a prior art method for producing a long ceramic body.
Figure 2B:
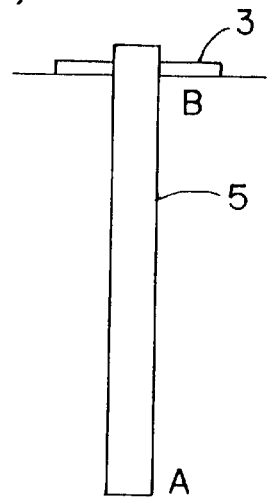

In the present invention, as FIG. 1(a) shows, a long body 5 of a non-sintered ceramic body is fired at a temperature at which sintering takes place until sintering is completed under a condition where the long body 5 is suspended in a sheath 4 in the same manner as in the conventional methods. The sintered body obtained by first firing exhibits the shape having a large warp particularly in the lower part thereof. Next, as FIG. 1(b) shows, the long body 5 is inverted upside down, and heated again at a temperature at which sintering takes place where plastic deformation takes place, when a load with a predetermined magnitude is applied downwardly to the vicinity of the lower end of the long body 5. Specifically, the lower part of the long body 5 having a large warp is suspended as the upper part of the reversed body 5, a predetermined load is applied to the vicinity of the lower end of the reversed long body 5, and the long body 5 is fired again at a temperature at which sintering takes place where plastic deformation takes place, whereby the lower part (the upper part during second firing) warped during first firing is pulled downwards by the predetermined force, and warping is corrected.

The magnitude of the load applied during second firing is preferably between 0.01 and 300 MPa. This is for correcting the warp of the long body effectively, and obtaining a high shape accuracy while preventing the damage of the long body during second firing. Specifically, in second firing, since the long body is again in a condition where plastic deformation takes place, if the magnitude of the load exceeds 300 MPa, the long body will be damaged during second firing, or if it is not damaged, it will be unnecessarily elongated affecting shape accuracy. If the magnitude of the load is less than 0.01 MPa, the warp of the long body cannot be corrected effectively, and desired shape accuracy cannot be achieved. More preferably the magnitude of the load is between 0.02 and 200 MPa.

By applying the load of a predetermined magnitude, the variation in the shape accuracy of the long body can be minimized, and a long ceramic body having a uniform shape accuracy can be obtained.

Although any loading methods may be used if the methods can apply a downward load in the above predetermined range to the lower end of the reversed long body, it is preferred that the weight is carried by the long body at the vicinity of the lower end thereof.

In the method of the present invention, since sintering is completed in first firing, the long body is little subjected to shrinkage during second firing, thus preventing deformation due to shrinkage.

In the present invention, although the temperatures for first firing and second firing are preferably 800° C. or above, it is not required that these are the same temperature. It is preferred that a temperature for second firing is 1,000° C. or above, and that when a lower temperature as 800–1,000° C. is used, a slightly larger load as 10–300 MPa is applied.

The raising rate of temperature to a temperature at which sintering takes place (retention temperature) for first firing is preferably as slow as possible, such as 200° C./hr or less. If the raising rate of temperature is too high, shrinkage occurs rapidly, which causes not only deformation to increase, but also residual stress to occur, and is not preferred in terms of strength. On the other hand, the raising rate of temperature for second firing is preferably the same as or lower than that for first firing.

As a method for suspending the long body in the sheath, for example, a through hole is made at the end of the long body, and the both ends of the needle-like suspending pin passed through the hole are suspended from the upper end of the sheath, or a constriction is formed on the end of the long body, which is used for suspending.

In the present invention, any oxide or non-oxide ceramic materials may be used as the materials of the long body, and may be selected according to its use conditions. For example, when it is used as the heat transfer tube for ceramic shell-and-tube-type heat exchangers, silicon nitride with high mechanical strength and high heat resistance is mainly used. The length of the long body, and its hole diameter when the long body is tubular are not limited to certain values, and may be selected according to its object and use conditions.

The present invention will be described below in further detail referring to embodiments, but these embodiments should not be construed to limit the present invention.

Embodiment 1

To 1,000 g of $Si_3N_4$ powder, 10 g of $Y_2O_3$, 10 g of MgO, 5 g of $ZrO_2$, as sintering additives, and 1 g of polyvinyl alcohol, as an organic binder were added, and 1,000 g of water was further added. This mixture was ground and mixed for 4 hours in an attritor using $Si_3N_4$ balls (5 mm in diameter). The resulting finely ground mixture was dried and granulated using a spray drier, and extruded into a long tubular body. The extruded long body was dried at 110° C. for 10 hours. After dried, the long body was calcined at 500° C. for 5 hours to remove the binder, and a calcined long body was obtained. Through holes for passing suspending pins were made at the both ends of the calcined body.

Figure 3A:
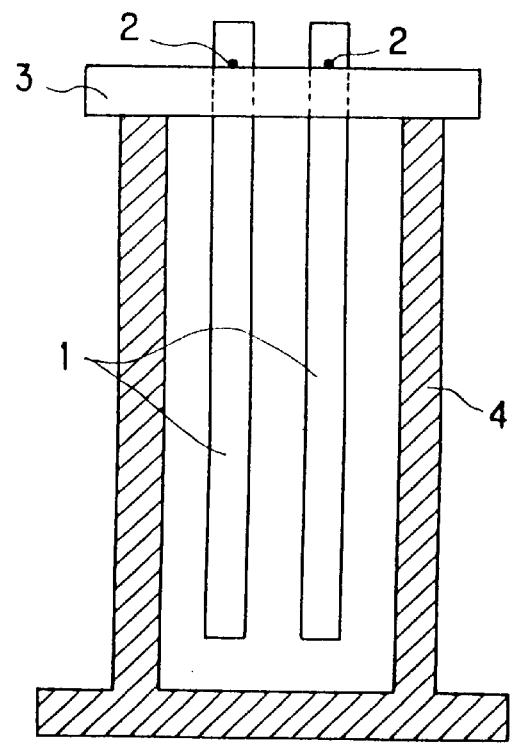
FIGS. 3(a) to 3(b) show a diagram illustrating a method for firing a long ceramic body.
Figure 3B:
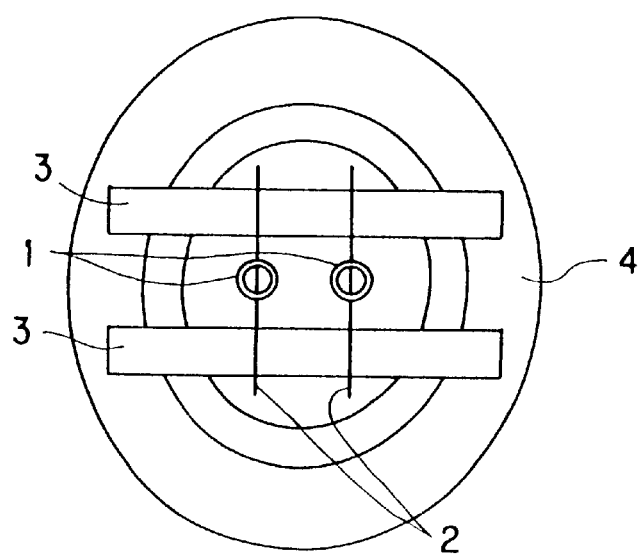

Next, as FIG. 3 shows, the calcined body was placed in a sheath 4, and the first firing was performed in a nitrogen atmosphere at a firing temperature of 1,650° C. and a temperature raising rate of 50° C./hr. The firing time, that is the retention time at the firing temperature was 1 hour. FIG. 3(a) is the side view showing the state of firing, and FIG. 3(b) is the top view thereof. Specifically, two square-pillar-shaped support bars 3 were placed substantially in parallel to each other at a predetermined distance on the upper end of the columnar sheath 4 with a bottom, needle-like suspending pins 2 were passed through the holes made at the ends of the calcined bodies 1, the both ends of each suspending pin 2 were placed on the two support bars 3 to hang the calcined bodies 1 in the sheath 4, and first firing was performed.

After first firing, the resulted sintered bodies were inverted upside down, loads of 0.01 MPa was applied to each long body at the vicinity of the lower end thereof, and firing was performed again at the same firing temperature, temperature raising rate, and firing time as first firing.

Figure 4:
FIG. 4 shows a diagram illustrating straightness.
Figure 5A:
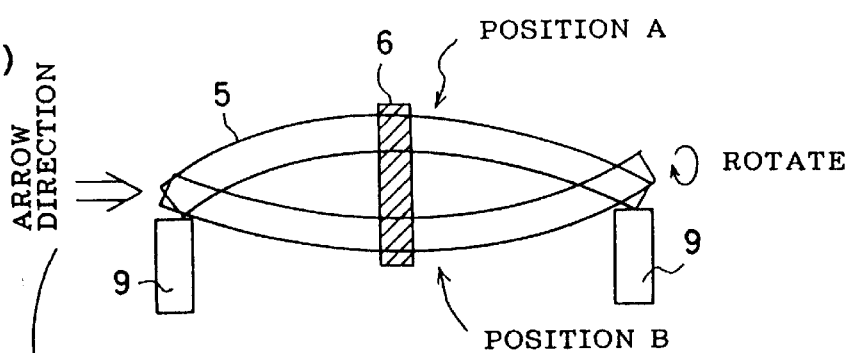
FIGS. 5(a) to 5(d) show a diagram illustrating a method for measuring straightness.
Figure 5B:
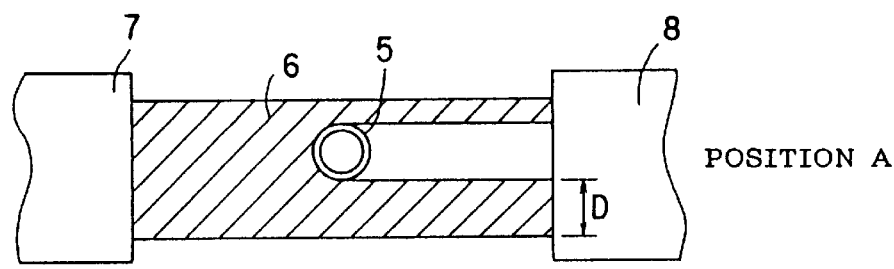
Figure 5C:
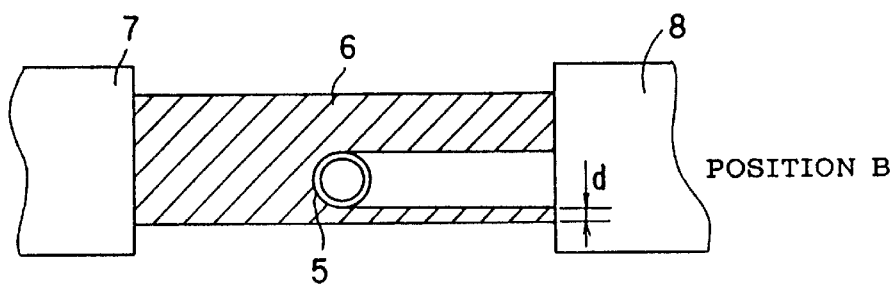
Figure 5D:
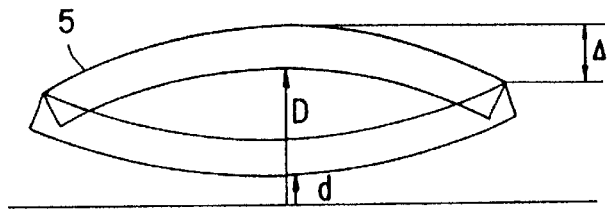

Ten tubular long bodies of an outer diameter of 9 mm, an inner diameter of 6 mm, and a length of 600 mm were produced by the above method, and the straightness, roundness, and minimum outer diameter of each sample were measured. The mean values and standard deviations of each value are shown in Table 1. The term "straightness" used herein means the bending amount Δ of the long body 5 after sintering as FIG. 4 shows. Specifically, as FIGS. 5(a)–(d) show, it was calculated using the following equation from distances D and d of the position from the lower end of the laser beam 1 where the deformed point was highest (position A) and lowest (position B), respectively, obtained by rotating the long body 5 placed on the support table 9 between the emitting part 7 and the receiving part 8 of laser beams 6 shown by oblique lines.

Straightness: $\Delta=(D-d)/2$

Embodiments 2–13

Ten tubular ceramic bodies were produced for each embodiment under the same conditions as in Embodiment 1, except that the magnitudes of loads applied to the long bodies at the lower ends thereof during firing were 0.02, 0.04, 0.06, 0.08, 0.10, 0.12, 0.14, 0.16, 0.18, 0.20, 0.25, and 0.30 MPa in the order from Embodiment 2 to Embodiment 13. As in Embodiment 1, the straightness, roundness, and minimum outer diameter of each sample were measured, and the mean values and standard deviations of each value were obtained. The results are shown in Table 1.

COMPARATIVE EXAMPLE 1

Ten tubular ceramic bodies were produced under the same conditions as in Embodiment 1, except that no loads were applied to the long body during firing. As in Embodiment 1, the straightness, roundness, and minimum outer diameter of each sample were measured, and the mean values and standard deviations of each value were obtained. The results are shown in Table 1.

COMPARATIVE EXAMPLES 2, 3, and 4

Ten tubular ceramic bodies were produced for each embodiment under the same conditions as in Embodiment 1, except that the magnitudes of loads applied to the long bodies at the lower ends thereof during refiring were 0.001, 0.005, and 0.008 MPa in the order from Comparative Examples 2, 3, and 4. As in Embodiment 1, the straightness, roundness, and minimum outer diameter of each sample were measured, and the mean values and standard deviations of each value were obtained. The results are shown in Table 1.

The fluctuation of straightness and roundness in Embodiments were as small as 0.3 or less and less than 0.1, shown in standard deviations, respectively, whereas those in Comparative Examples were as large as about 1.0 and about 0.1 or more, respectively.

Embodiment 14

Ten long ceramic bodies having a length of a side of the end surface of 15 mm and a length of 600 mm were produced under the same conditions as in Embodiment 1, except that the shape thereof was a solid square pillar. As in Embodiment 1, the straightness, roundness, and outer diameter of each sample were measured, and the mean values and standard deviations of each value were obtained. The results are shown in Table 2.

Embodiments 15–26

Ten long ceramic bodies were produced for each embodiment under the same conditions as in Embodiment 14,

TABLE 1

| | First firing | | Second firing | | | Shape accuracy | | |
|---|---|---|---|---|---|---|---|---|
| | Firing temperature (°C.) | Temperature raising rate (°C/hr) | Firing temperature (°C.) | Temperature raising rate (°C hr) | Load (MPa) | Straightness (mm) (standard deviation) | Roundness (mm) (standard deviation) | Minimum outer diameter (mm) |
| Embodiment | | | | | | | | |
| 1 | 1650 | 50 | 1650 | 50 | 0.01 | 0.7 (0.3) | 0.19 (0.09) | 9.00 |
| 2 | 1650 | 50 | 1650 | 50 | 0.02 | 0.5 (0.07) | 0.11 (0.06) | 9.01 |
| 3 | 1650 | 50 | 1650 | 50 | 0.04 | 0.4 (0.03) | 0.1 (0.05) | 9.02 |
| 4 | 1650 | 50 | 1650 | 50 | 0.06 | 0.4 (0.05) | 0.09 (0.04) | 9.00 |
| 5 | 1650 | 50 | 1650 | 50 | 0.08 | 0.5 (0.04) | 0.11 (0.05) | 9.03 |
| 6 | 1650 | 50 | 1650 | 50 | 0.1 | 0.4 (0.03) | 0.08 (0.04) | 8.99 |
| 7 | 1650 | 50 | 1650 | 50 | 0.12 | 0.5 (0.05) | 0.08 (0.06) | 8.89 |
| 8 | 1650 | 50 | 1650 | 50 | 0.14 | 0.5 (0.04) | 0.09 (0.05) | 8.73 |
| 9 | 1650 | 50 | 1650 | 50 | 0.16 | 0.4 (0.04) | 0.1 (0.06) | 8.71 |
| 10 | 1650 | 50 | 1650 | 50 | 0.18 | 0.3 (0.03) | 0.1 (0.06) | 8.54 |
| 11 | 1650 | 50 | 1650 | 50 | 0.2 | 0.3 (0.03) | 0.09 (0.04) | 8.32 |
| 12 | 1650 | 50 | 1650 | 50 | 0.25 | 0.4 (0.04) | 0.09 (0.05) | 8.24 |
| 13 | 1650 | 50 | 1650 | 50 | 0.3 | 0.3 (0.03) | 0.08 (0.05) | 8.01 |
| Comparative Example | | | | | | | | |
| 1 | 1650 | 50 | 1650 | 50 | — | 1.0 (0.8) | 0.33 (0.11) | 9.01 |
| 2 | 1650 | 50 | 1650 | 50 | 0.001 | 1.2 (0.9) | 0.31 (0.13) | 9.03 |
| 3 | 1650 | 50 | 1650 | 50 | 0.005 | 1.1 (0.8) | 0.29 (0.13) | 9.03 |
| 4 | 1650 | 50 | 1650 | 50 | 0.008 | 1.1 (0.07) | 0.28 (0.10) | 9.02 |

Figure 6:
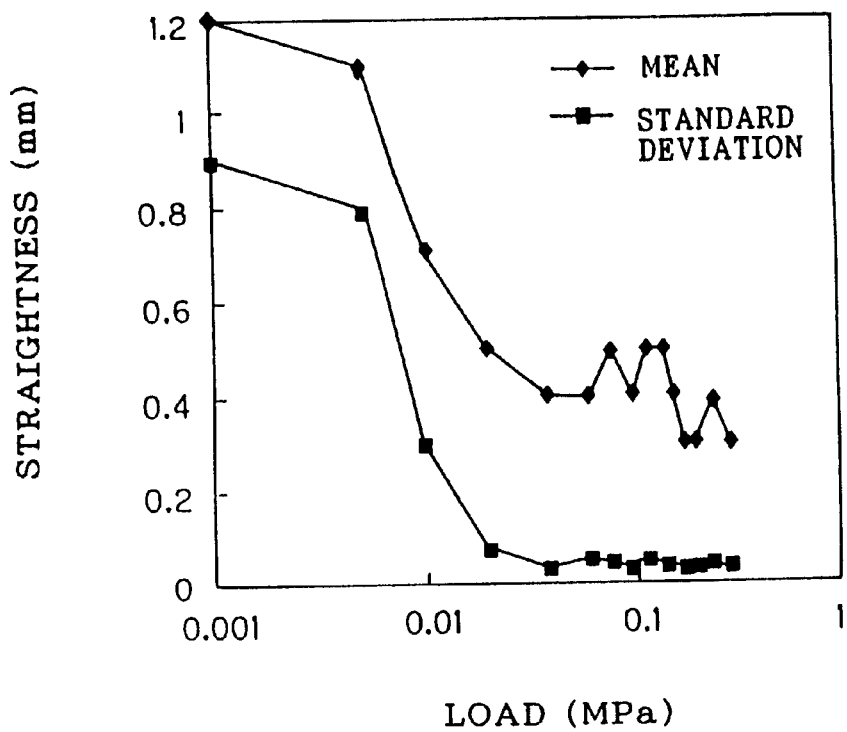
FIG. 6 is a graph showing the mean values and the standard deviations of straightness plotted on loads.
Figure 7:
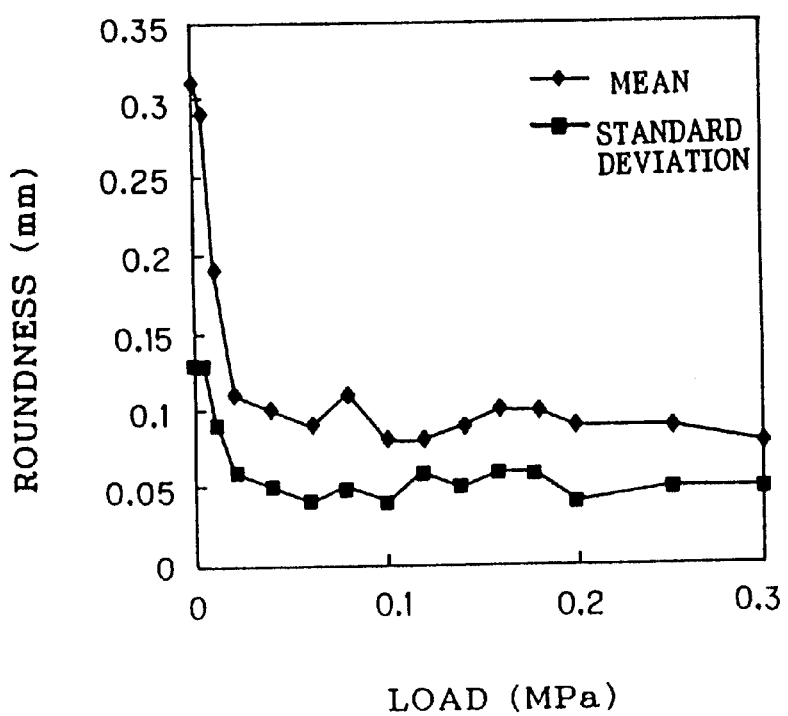
FIG. 7 is a graph showing the mean values and the standard deviations of roundness plotted on loads.
Figure 8:
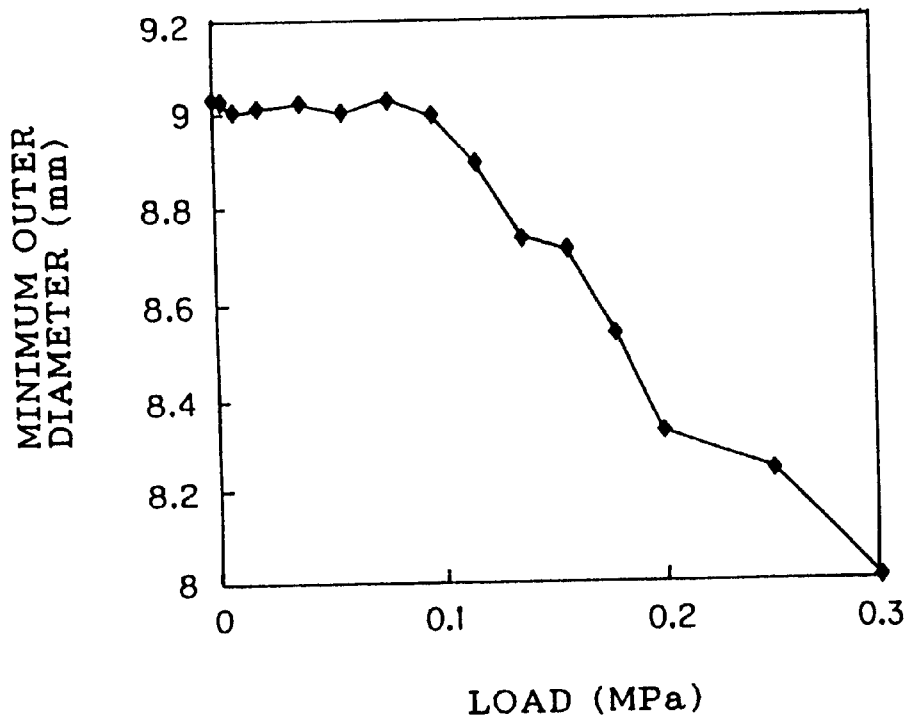
FIG. 8 is a graph showing the mean values of the smallest outer diameters plotted on loads.

A graph showing the mean values and the standard deviations of straightness plotted on loads is shown in FIG. 6; a graph showing the mean values and the standard deviations of roundness plotted on loads is shown in FIG. 7; and a graph showing the mean values of the smallest outer diameters plotted on loads is shown in FIG. 8.

It is found from Table 1 and FIG. 6 that the mean values of straightness of all of tubular ceramic bodies in Embodiments 1 through 13, to which loads within a range between 0.01 and 300 MPa were applied at the lower ends thereof during refiring, was 0.7 mm or less, whereas the mean values of straightness of all of tubular ceramic bodies in Comparative Example 1, to which no loads were applied, and in Comparative Examples 2, 3, and 4, to which loads outside the above range were applied during refiring, was around 1.0 mm.

For roundness, it was seen from Table 1 and FIG. 7 that the mean values of all of tubular ceramic bodies in Embodiments 1 through 13 was 0.20 mm or less, whereas the mean values of all of tubular ceramic bodies in Comparative Examples were as large as around 0.30 mm. The improvement of roundness by the application of loads is considered because the collapse of the cross-sectional shape due to deformation has been corrected.

except that the magnitudes of loads applied to the long bodies at the lower ends thereof during refiring were 0.02, 0.04, 0.06, 0.08, 0.10, 0.12, 0.14, 0.16, 0.18, 0.20, 0.25, and 0.30 MPa in the order from Embodiment 15 to Embodiment 26. As in Embodiment 1, the straightness, and outer diameter of each sample were measured, and the mean values and standard deviations of each value were obtained. The results are shown in Table 2.

COMPARATIVE EXAMPLE 5

Ten long ceramic bodies were produced under the same conditions as in Embodiment 14, except that no loads were applied to the long body at the lower ends thereof during refiring. As in Embodiment 1, the straightness and outer diameter of each sample were measured, and the mean values and standard deviations of each value were obtained. The results are shown in Table 2.

COMPARATIVE EXAMPLES 6, 7, and 8

Ten long ceramic bodies were produced for each embodiment under the same conditions as in Embodiment 14, except that the magnitudes of loads applied to the long bodies at the lower ends thereof during firing were 0.001, 0.005, and 0.008 MPa in the order from Comparative Examples 6, 7, and 8. As in Embodiment 1, the straightness and outer diameter of each sample were measured, and the mean values and standard deviations of each value were obtained. The results are shown in Table 2.

TABLE 2

|  | First firing | | Second firing | | | Shape accuracy | |
| --- | --- | --- | --- | --- | --- | --- | --- |
|  | Firing temperature (°C.) | Temperature raising rate (°C/hr) | Firing temperature (°C.) | Temperature raising rate (°C/hr) | Load (MPa) | Straightness (mm) (standard deviation) | Minimum outer diameter (mm) |
| Embodiment | | | | | | | |
| 14 | 1650 | 50 | 1650 | 50 | 0.01 | 0.8 (0.4) | 9.02 |
| 15 | 1650 | 50 | 1650 | 50 | 0.02 | 0.5 (0.09) | 9.00 |
| 16 | 1650 | 50 | 1650 | 50 | 0.04 | 0.4 (0.05) | 9.03 |
| 17 | 1650 | 50 | 1650 | 50 | 0.06 | 0.6 (0.06) | 9.00 |
| 18 | 1650 | 50 | 1650 | 50 | 0.08 | 0.5 (0.05) | 9.01 |
| 19 | 1650 | 50 | 1650 | 50 | 0.1 | 0.4 (0.05) | 9.00 |
| 20 | 1650 | 50 | 1650 | 50 | 0.12 | 0.5 (0.05) | 8.90 |
| 21 | 1650 | 50 | 1650 | 50 | 0.14 | 0.5 (0.03) | 8.80 |
| 22 | 1650 | 50 | 1650 | 50 | 0.16 | 0.3 (0.04) | 8.69 |
| 23 | 1650 | 50 | 1650 | 50 | 0.18 | 0.3 (0.05) | 8.60 |
| 24 | 1650 | 50 | 1650 | 50 | 0.2 | 0.5 (0.04) | 8.35 |
| 25 | 1650 | 50 | 1650 | 50 | 0.25 | 0.4 (0.03) | 8.19 |
| 26 | 1650 | 50 | 1650 | 50 | 0.3 | 0.4 (0.03) | 7.99 |
| Comparative Example | | | | | | | |
| 5 | 1650 | 50 | 1650 | 50 | — | 1.4 (0.7) | 9.02 |
| 6 | 1650 | 50 | 1650 | 50 | 0.001 | 1.3 (1.1) | 9.03 |
| 7 | 1650 | 50 | 1650 | 50 | 0.005 | 1.0 (0.7) | 9.03 |
| 8 | 1650 | 50 | 1650 | 50 | 0.008 | 1.0 (0.8) | 9.01 |

Figure 9:
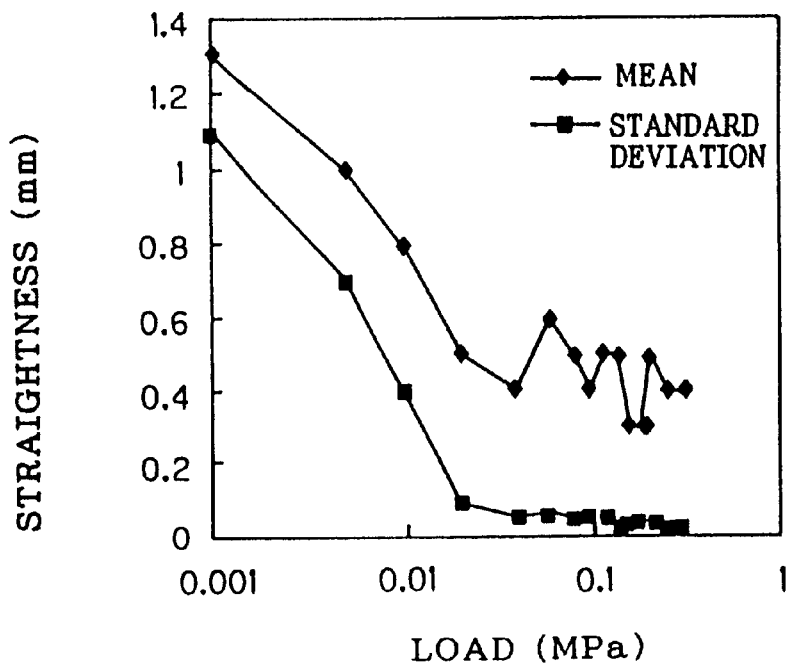
FIG. 9 is a graph showing the mean values and the standard deviations of straightness plotted on loads.
Figure 10:
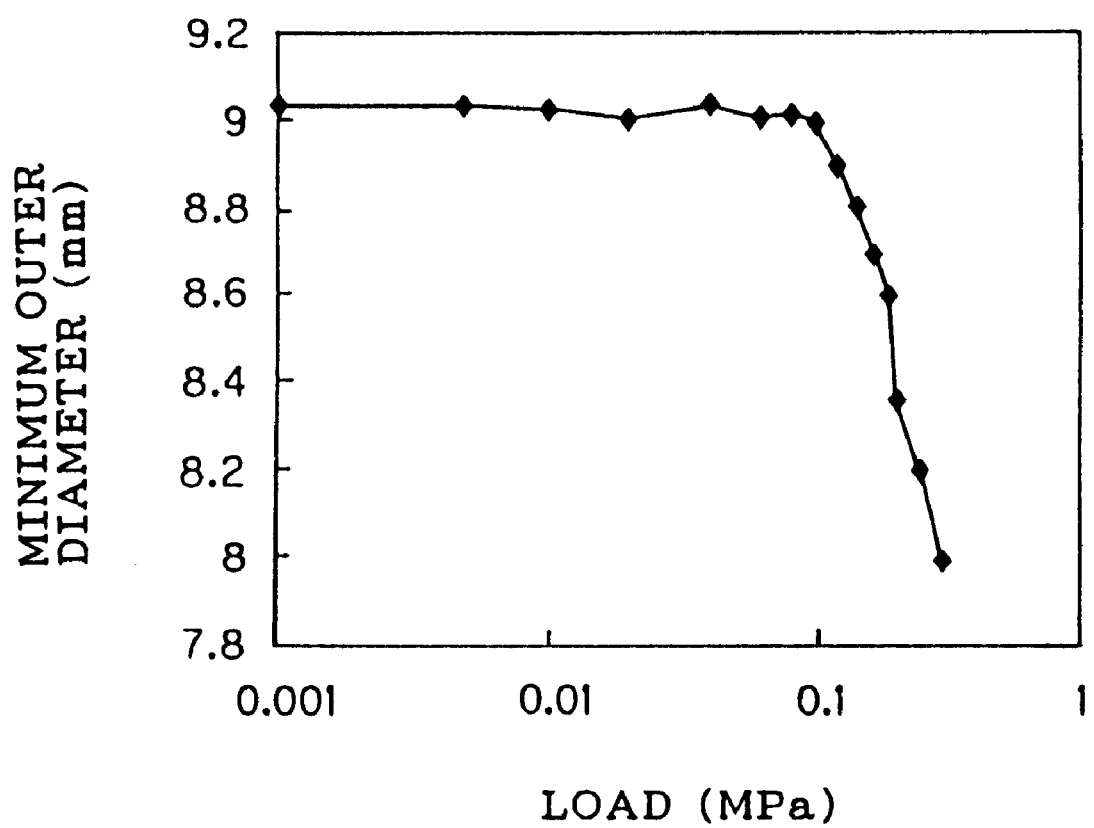
FIG. 10 is a graph showing the mean values of the smallest outer diameters plotted on loads.

A graph showing the mean values and the standard deviations of straightness plotted on loads is shown in FIG. 9; and a graph showing the mean values of the smallest outer diameters plotted on loads is shown in FIG. 10.

It is found from Table 2 and FIG. 9 that the mean values of straightness of all of long ceramic bodies in Embodiments 14 through 26, to which loads within a range between 0.01 and 300 MPa were applied at the lower ends thereof, was 0.8 mm or less, whereas the mean values of straightness of all of long ceramic bodies in Comparative Example 5, to which no loads were applied, and in Comparative Examples 6, 7, and 8, to which loads outside the above range were applied, was 1.0 mm or more.

The fluctuation of straightness in Embodiments were as small as 0.4 or less in standard deviations, whereas that in Comparative Examples were as large as about 0.7 or more.

According to the method of the present invention, since a load of a predetermined magnitude is applied to the long body at the vicinity of the lower end thereof in second firing in which the long body is inverted upside down, the warp of the long body can be corrected effectively, the fluctuation of shape accuracy of the long body after firing can be minimized, and a long ceramic body with uniform and high shape accuracy can be obtained. Therefore, the method of the present invention can be used suitably, for example, as a method for producing heat transfer tubes for shell-and-tube-type heat exchangers and the like corresponding to increase in the length of heat transfer tubes.

What is claimed is:

1. A method for producing a long sintered ceramic body, comprising the steps of:

a) providing a long non-sintered ceramic body having upper and lower ends;

b) providing a sheath having an interior surface;

c) suspending said non-sintered body in said sheath so that said non-sintered body does not directly contact said interior surface whereby said lower end lies above said upper end;

d) firing said suspended non-sintered body at a sufficient temperature and for a sufficient time to sinter said non-sintered body;

e) inverting the sintered body obtained in step d) such that said upper end lies above said lower end and applying a downward load thereto near the lower end thereof; and then f) re-firing the sintered body at a sufficient temperature and for a sufficient time to re-sinter the body.

2. A method for producing a long ceramic body according to claim 1, wherein the magnitude of said load is 0.01–300 MPa.

3. A method for producing a long ceramic body according to claim 2, wherein the magnitude of said load is 0.02–200 MPa.

4. A method for producing a long ceramic body according to claim 1, wherein said load is applied by having said long body carry a weight near said lower end thereof.

5. A method for producing a long ceramic body according to claim 1, wherein the temperature of re-firing is 800° C. or above.

6. A method for producing a long ceramic body according to claim 5, wherein the temperature of re-firing is 1000° C. or above.

7. A method for producing a long ceramic body according to claim 1, wherein the temperature of re-firing is 800° C. or above.

8. A method for producing a long ceramic body according to claim 1, wherein the temperature of re-firing is 800–1000° C.

9. A method for producing a long ceramic body according to claim 8, wherein the magnitude of said load is 10–300 MPa.

10. A method for producing a long ceramic body according to claim 1, wherein the step d) sintering of said non-sintered body is carried out at a retention temperature of 200° C./hr or below.

11. A method for producing a long ceramic body according to claim 1, wherein the step d) sintering of said non-sintered body is carried out in a nitrogen atmosphere and at a temperature of 1650° C.

12. A method for producing a long ceramic body according to claim 11, wherein the step d) sintering of said non-sintered body is carried out at a retention temperature of 50° C./hr.

13. A method for producing a long ceramic body according to claim 1, wherein the step d) sintering of said non-sintered body is carried out for one hour.

14. A method for producing a long ceramic body according to claim 1, wherein the step f) re-firing of the sintered body is carried out at the same temperature and for the same time as in step d).

15. A method for producing a long ceramic body according to claim 1, wherein the step f) re-firing of the sintered body is carried out at a retention temperature of 200° C./hr or below.

16. A method for producing a long ceramic body according to claim 1, wherein said non-sintered body comprises a material selected from the group consisting of an oxide and a non-oxide ceramic material.

* * * * *